(12) United States Patent
Kusase

(10) Patent No.: US 10,236,756 B2
(45) Date of Patent: Mar. 19, 2019

(54) ROTATING ELECTRIC MACHINE

(71) Applicant: DENSO CORPORATION, Kariya, Aichi-pref. (JP)

(72) Inventor: Shin Kusase, Kariya (JP)

(73) Assignee: DENSO CORPORATION, Kariya (JP)

( * ) Notice: Subject to any disclaimer, the term of this patent is extended or adjusted under 35 U.S.C. 154(b) by 194 days.

(21) Appl. No.: 15/089,714

(22) Filed: Apr. 4, 2016

(65) Prior Publication Data

US 2016/0294232 A1    Oct. 6, 2016

(30) Foreign Application Priority Data

Apr. 2, 2015    (JP) .................................. 2015-076088

(51) Int. Cl.
*H02K 11/33* (2016.01)
*H02K 21/04* (2006.01)
*H02P 3/24* (2006.01)

(52) U.S. Cl.
CPC ............. *H02K 21/046* (2013.01); *H02P 3/24* (2013.01); *H02K 11/33* (2016.01)

(58) Field of Classification Search
CPC ................................ H02K 21/046; H02P 3/24
USPC ......................................................... 310/68 D
See application file for complete search history.

(56) References Cited

U.S. PATENT DOCUMENTS

| | | | | |
|---|---|---|---|---|
| 4,882,515 A * | 11/1989 | Radomski | ............... | H02K 16/02 310/168 |
| 5,682,073 A | 10/1997 | Mizuno | | |
| 6,072,303 A * | 6/2000 | Nickoladze | ............ | H02K 19/26 322/20 |
| 2003/0102738 A1* | 6/2003 | Kusase | .................. | H02K 19/26 310/75 R |
| 2005/0006972 A1* | 1/2005 | Bradfield | ............... | H02K 1/243 310/180 |
| 2007/0145850 A1* | 6/2007 | Hsu | ...................... | H02K 1/2766 310/156.56 |
| 2011/0254379 A1* | 10/2011 | Madawala | .............. | H02J 5/005 307/104 |

(Continued)

FOREIGN PATENT DOCUMENTS

| JP | H06-351206 A | 12/1994 |
|---|---|---|
| JP | 2010-259290 A | 11/2010 |

(Continued)

OTHER PUBLICATIONS http://hyperphysics.phy-astr.gsu.edu/hbase/electric/farlaw.html.*

*Primary Examiner* — Terrance L Kenerly
(74) *Attorney, Agent, or Firm* — Oliff PLC

(57) ABSTRACT

A rotating electric machine includes a multi-phase coil, an armature core, a rotor, a yoke core and a superimposer. The armature core has the multi-phase coil wound thereon. The rotor is rotatably disposed and has a plurality of magnetic poles facing the armature core. The yoke core is arranged so as to surround outer peripheries of the multi-phase coil and the armature core. The yoke core is magnetically connected with the magnetic poles of the rotor. The superimposer superimposes a DC component on a multi-phase alternating current supplied to the multi-phase coil, thereby supplying a DC field magnetic flux to a magnetic circuit that is formed by the armature core, the magnetic poles of the rotor and the yoke core.

12 Claims, 9 Drawing Sheets

(56) References Cited

U.S. PATENT DOCUMENTS

| | | | |
|---|---|---|---|
| 2012/0091848 A1* | 4/2012 | Sakai | H02K 1/2766 310/156.43 |
| 2013/0221788 A1 | 8/2013 | Yokota et al. | |
| 2018/0278175 A1* | 9/2018 | Korhonen | H02M 7/217 |

FOREIGN PATENT DOCUMENTS

| | | |
|---|---|---|
| JP | 2013-212037 A | 10/2013 |
| JP | 2016-144291 A | 8/2016 |

\* cited by examiner

ROTATING ELECTRIC MACHINE

CROSS-REFERENCE TO RELATED APPLICATION

This application is based on and claims priority from Japanese Patent Application No. 2015-76088 filed on Apr. 2, 2015, the content of which is hereby incorporated by reference in its entirety into this application.

BACKGROUND

1 Technical Field

The present invention relates to rotating electric machines which include a multi-phase coil and an armature core.

2 Description of Related Art

To achieve a small size, high performance, long service life and high reliability, it is general for rotating electric machines to employ a brushless structure with a permanent magnet field. On the other hand, for usage in a wide rotational speed range, it is necessary to vary the strength of field. However, with the aforementioned permanent magnet field, it is difficult to vary the strength of field; thus losses occur and there are limits on the characteristics of the rotating electric machines. Therefore, one may consider employing a winding field instead of the permanent magnet field. However, the space required for receiving a winding is generally larger than that required for receiving a permanent magnet. Moreover, a winding is generally required to be surrounded by a core. Consequently, a considerably large volume is required for employing the winding field. As a result, it is difficult to achieve the original object, i.e., to achieve a small size and high permeance.

Japanese Patent Application Publication No. JP2013212037A discloses a hybrid excitation rotating electric machine that has an exciting coil arranged in a suitable position, thereby forming a desired magnetic circuit without increasing the size of the rotating electric machine; the exciting coil functions to excite magnetic poles that are not magnetized by permanent magnets. More specifically, the hybrid excitation rotating electric machine includes: a rotor having first and second rotor cores; a stator that generates a rotating magnetic field for rotating the rotor; and the exciting coil that protrudes radially inward from the stator so as to be arranged in a gap formed between the first and second rotor cores.

However, with the above configuration of the hybrid excitation rotating electric machine, the number of the rotor cores is equal to 2, thus increasing the parts count and size of the rotating electric machine. Moreover, the magnetomotive force of the exciting coil acts in a direction of weakening the magnetomotive forces of permanent-magnet magnetic poles. Consequently, when electric current supplied to the exciting coil is increased for the purpose of increasing the output of the rotating electric machine, the potentials of permanent magnets are suppressed.

SUMMARY

According to exemplary embodiments, a rotating electric machine is provided which includes a multi-phase coil, an armature core, a rotor, a yoke core and a superimposer. The armature core has the multi-phase coil wound thereon. The rotor is rotatably disposed and has a plurality of magnetic poles facing the armature core. The yoke core is arranged so as to surround outer peripheries of the multi-phase coil and the armature core. The yoke core is magnetically connected with the magnetic poles of the rotor. The superimposer superimposes a DC component on a multi-phase alternating current supplied to the multi-phase coil, thereby supplying a DC field magnetic flux to a magnetic circuit that is formed by the armature core, the magnetic poles of the rotor and the yoke core.

With the above configuration, it becomes possible to apply a field without employing brushes. Moreover, it is possible to control the field by varying the amplitude and/or direction of the DC component. In other words, it is possible to perform the field control while performing an electric drive control of the rotating electric machine by controlling the multi-phase alternating current supplied to the multi-phase coil. Consequently, it becomes possible to realize a brushless variable field without employing a field winding. Further, since no additional winding is needed for performing the field control, it becomes possible to minimize the size of the rotating electric machine. Moreover, since the field is applied by utilizing the multi-phase coil wound on the armature core, it becomes possible to secure desired characteristics of the rotating electric machine. As a result, it becomes possible to achieve both minimization of the size of the rotating electric machine and the brushless variable field.

It is preferable that part or the whole of the yoke core is configured as a supporting member to support the armature core.

The rotor may include a rotor core, a plurality of permanent magnets, at least one insertion hole and at least one soft-magnetic member. The rotor core is formed by laminating a plurality of annular magnetic steel sheets. The permanent magnets are provided in the rotor core so as to be spaced from each other in a circumferential direction of the rotor core. The at least one insertion hole is formed between one circumferentially-adjacent pair of the permanent magnets. The at least one soft-magnetic member is inserted and fixed in the at least one insertion hole. The magnetic poles of the rotor may be formed of the permanent magnets and the at least one soft-magnetic member.

Preferably, the multi-phase coil is a wave-shaped full-pitch coil that is wound on the armature core so as to meander alternately in the axial and circumferential directions of the armature core at a circumferential pitch that is 180° in electrical angle.

The rotating electric machine may further include an electric power converter that has one H bridge for each phase of the multi-phase coil. In superimposing the DC component on the multi-phase alternating current, the superimposer may preferably vary the amplitude of the multi-phase alternating current and the amplitude of the DC component separately.

The yoke core and the magnetic poles of the rotor may be magnetically connected with each other via an axial gap and a radial gap. The axial gap is formed between the yoke core and the rotor in an axial direction of the rotor. The radial gap is formed between the yoke core and the rotor on the opposite radial side of the rotor to the armature core.

The rotating electric machine may further has an excitation means provided in the yoke core. Upon being supplied with a direct current that is different from the DC component superimposed by the superimposer on the multi-phase alternating current, the excitation means generates magnetic flux which is added to the magnetic circuit.

The magnetic poles of the rotor may be claw-shaped and supported by a non-magnetic support.

The rotating electric machine may further include a nonpolar auxiliary pole that has an annular portion and a plurality of protruding portions that protrude from the annular portion and are magnetically connected with each other via the annular portion. Each of the protruding portions of the auxiliary pole is located between one circumferentially-adjacent pair of the magnetic poles.

The multi-phase coil may be a Y-connected three-phase coil. The rotating electric machine may further include at least one transistor, which intervenes between a neutral point of the three-phase coil and an electric power source, and means for controlling on/off operation of the at least one transistor and thereby charging an electromotive force of the three-phase coil into the electric power source.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
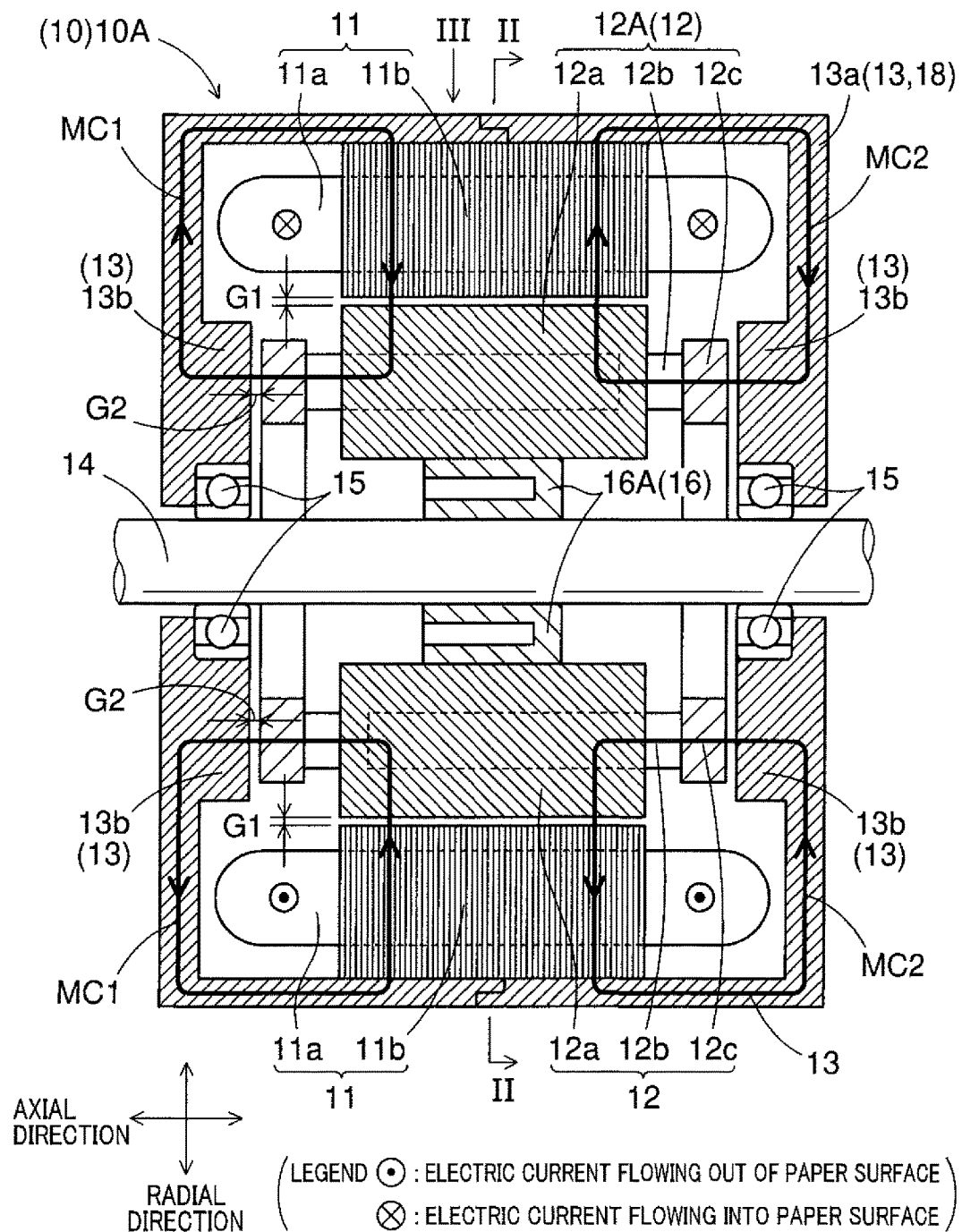
FIG. 1 is a schematic cross-sectional view of a rotating electric machine according to a first embodiment.

Exemplary embodiments will be described hereinafter with reference to FIGS. 1-16. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a rotating electric machine 10A according to a first embodiment. The rotating electric machine 10A is an example of a rotating electric machine 10 according to the present invention.

In addition, the rotating electric machine 10 according to the present invention may be an electric motor, an electric generator or a motor-generator that selectively functions either as an electric motor or as an electric generator.

As shown in FIG. 1, the rotating electric machine 10A includes an armature (or stator) 11, a rotor 12A, a rotating shaft 14, a pair of bearings 15 and a support 16A, all of which are received in a yoke core 13.

The yoke core 13 is an example of a supporting member 18 which can be formed of any suitable material into any suitable shape. The supporting member 18 corresponds to a frame or housing and supports at least an annular armature core 11b. The yoke core 13 includes a core main body 13a and a pair of protruding portions 13b. The protruding portions 13b axially protrude, respectively on opposite axial sides of the rotor 12A, from the core main body 13a toward the rotor 12A. In the present embodiment, the entire yoke core 13 is formed as the supporting member 18. Moreover, upon energization of a multi-phase coil 11a, magnetic circuits MC1 and MC2 are formed by the yoke core 13, the armature core 11b, an annular rotor core 12a, a plurality of soft-magnetic members 12b and a pair of annular side cores 12c.

The armature 11 is received in the yoke core 13 and fixed to the yoke core 13 by any suitable fixing means. The armature 11 includes the multi-phase coil 11a and the armature core (or stator core) 11b. The multi-phase coil 11a corresponds to an armature coil (or stator coil). The multi-phase coil 11a is wound on the armature core 11b so that electric current flows in the multi-phase coil 11a in directions as shown in FIG. 1. An example of winding the multi-phase coil 11a on the armature core 11b will be described in detail later with reference to FIG. 4. An electric drive control of the rotating electric machine 10A is performed by controlling a multi-phase alternating current supplied to the multi-phase coil 11a. The armature core 11b may be formed of a magnetic material in any suitable way. For example, the armature core 11b may be formed by laminating a plurality of magnetic steel sheets. Alternatively, the armature core 11b may also be formed of a magnetic material into a single piece.

Figure 3:
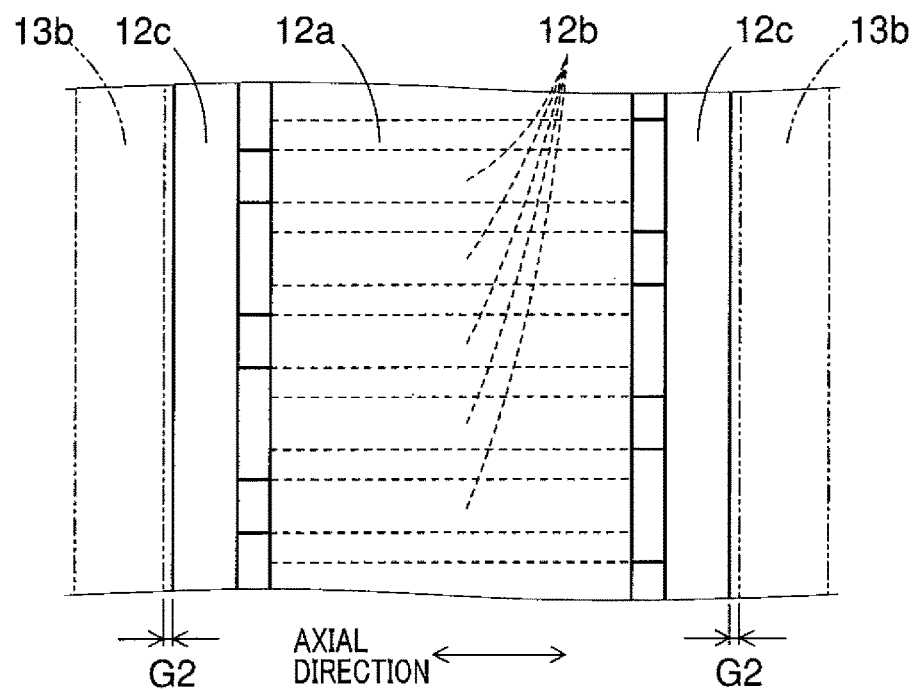
FIG. 3 is a plan view along the arrow III in FIG. 1, illustrating the configuration of annular side cores of the rotating electric machine according to the first embodiment.

The rotor 12A is an example of a rotor 12 according to the present invention. The rotor 12A includes the rotor core 12a, the plurality of soft-magnetic members 12b and the pair of side cores 12c. As shown in FIGS. 1 and 3, the side cores 12c are respectively located on opposite axial sides of the rotor core 12a and both fixed to the rotor core 12a via the soft-magnetic members 12b.

Figure 2:
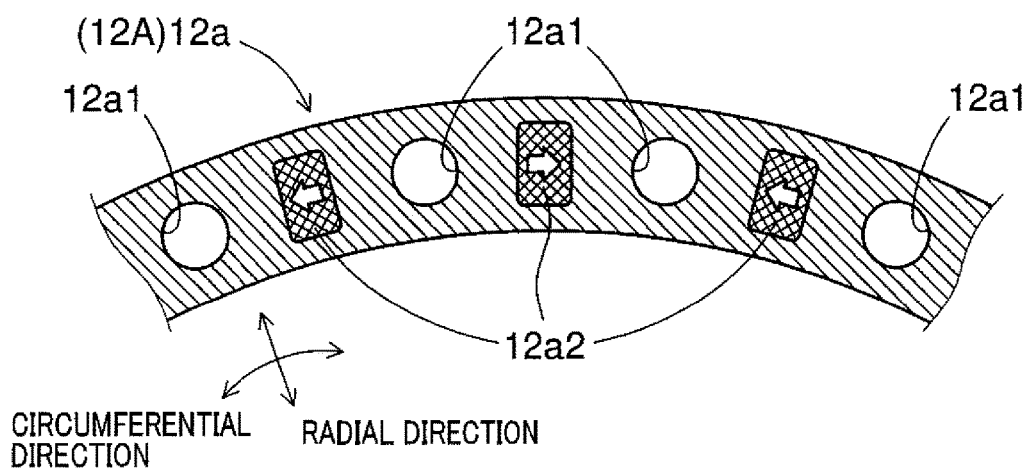
FIG. 2 is a cross-sectional view taken along the line II-II in FIG. 1, illustrating the configuration of a rotor core of the rotating electric machine according to the first embodiment.

The rotor core 12a is formed by laminating a plurality of annular magnetic steel sheets in the axial direction thereof. In other words, the rotor core 12a is a lamination-structured core. As shown in FIG. 2, the rotor core 12a has a plurality of insertion holes 12a1 and a plurality of permanent magnets 12a2 provided therein. The number of the insertion holes 12a1 and the number of the permanent magnets 12a2 can be set to any suitable numbers. The insertion holes 12a1 may be formed either as through holes or non-through holes (or recesses), provided that the soft-magnetic members 12b can be respectively inserted and fixed in the insertion holes 12a1. The permanent magnets 12a2 are magnetized so that for each circumferentially-adjacent pair of the permanent magnets 12a, the magnetization directions of the permanent magnets 12a are opposite to each other. The permanent magnets 12a together form a plurality of magnetic poles, the polarities of which alternate between north and south in the circumferential direction of the rotor core 12a. The magnetic poles introduce interlinked magnetic fluxes to the armature core 11b. In addition, though not shown in the figures, the rotor core 12a may also be constituted by a single magnetic member.

Each of the soft-magnetic members 12b is formed as a separate member from the rotor core 12a. The soft-magnetic members 12b may be formed into any shape such that magnetic flux can flow therethrough. In the present embodiment, the soft-magnetic members 12b are cylindrical pin-shaped (see FIGS. 1-3). The soft-magnetic members 12b are respectively inserted and fixed in the insertion holes 12a1 formed in the rotor core 12a. It is preferable for each of the insertion holes 12a1 to be formed at the center between one circumferentially-adjacent pair of the permanent magnets 12a2. In addition, though not shown in the figures, the soft-magnetic members 12b are also respectively inserted and fixed in insertion holes formed in the side cores 12c.

The annular side cores 12c, which are respectively located on opposite axial sides of the rotor core 12a, are each fixed to the rotor core 12a via at least one of the soft-magnetic members 12b. As shown in FIG. 3, the soft-magnetic members 12b fixed to one of the side cores 12c (e.g., the left side core 12c in FIG. 3) are inserted and fixed in different ones of the insertion holes 12a1 of the rotor core 12a from the soft-magnetic members 12b fixed to the other side core 12c (e.g., the right side core 12c in FIG. 3).

Referring back to FIG. 1, between the armature 11 and the rotor 12A, there is formed an annular radial gap G1. Moreover, between the rotor 12A and the yoke core 13, there are formed a pair of axial gaps G2 respectively on opposite axial sides of the rotor 12A. The sizes (or widths) of the gaps G1 and G2 can be set to any suitable values to the extent that the magnetic circuits MC1 and MC2 can be formed. In addition, the size of the gap G1 may be set to be either equal to or different from the size of the gaps G2.

The rotating shaft 14 is rotatably supported by the yoke core 13 via the bearings 15. The rotor 12A (more specifically, the rotor core 12a) is supported by and fixed to the rotating shaft 14 via the support 16A that is formed of a non-magnetic material. Consequently, the rotor 12A and the rotating shaft 14 rotate together with each other.

The support 16A is one example of a support 16 according to the present invention. In the present embodiment, the support 16A is annular in overall shape and has a U-shaped cross section perpendicular to the circumferential direction thereof. In addition, it should be noted that the support 16A may have any other suitable shape.

Figure 4:
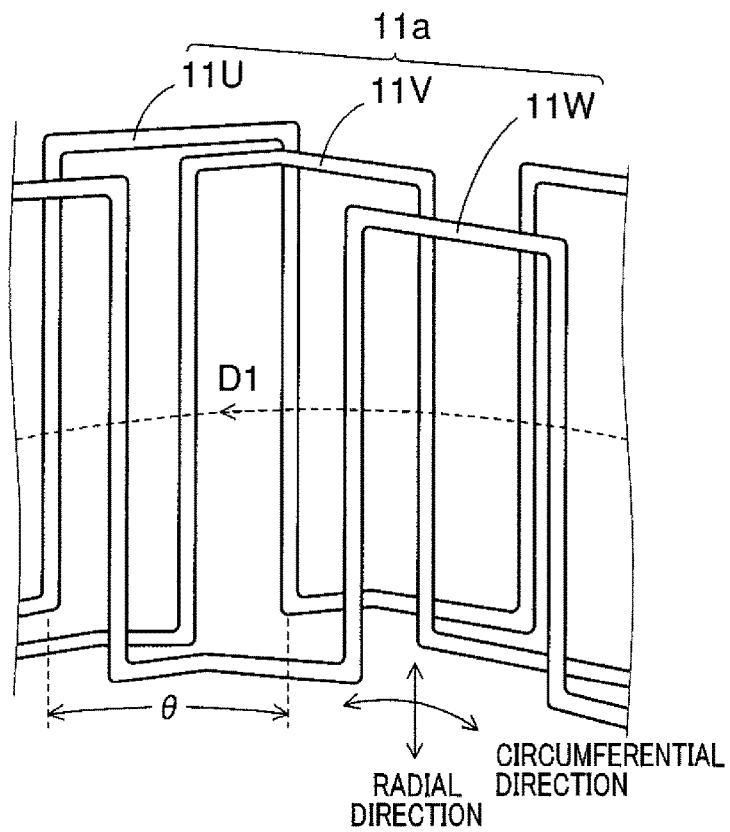
FIG. 4 is a schematic view illustrating a winding example of a multi-phase coil of the rotating electric machine according to the first embodiment.

Referring now to FIG. 4, in the present embodiment, the multi-phase coil 11a is comprised of a U-phase winding 11U, a V-phase winding 11V and a W-phase winding 11W. That is, the multi-phase coil 11a is a three-phase coil. Each of the U-phase, V-phase and W-phase windings 11U-11W is a wave-shaped full-pitch winding. More specifically, each of the U-phase, V-phase and W-phase windings 11U-11W is wound on the armature core 11b so as to meander alternately in the axial and circumferential directions of the armature core 11b at a circumferential pitch of θ that is 180° in electrical angle. In addition, the dashed-line arrow D1 in FIG. 4 indicates the direction of rotation of the rotor 12A.

In addition, each of the U-phase, V-phase and W-phase windings 11U-11W may be formed of either a single continuous electric wire or a plurality of electric conductor segments.

Figure 5:
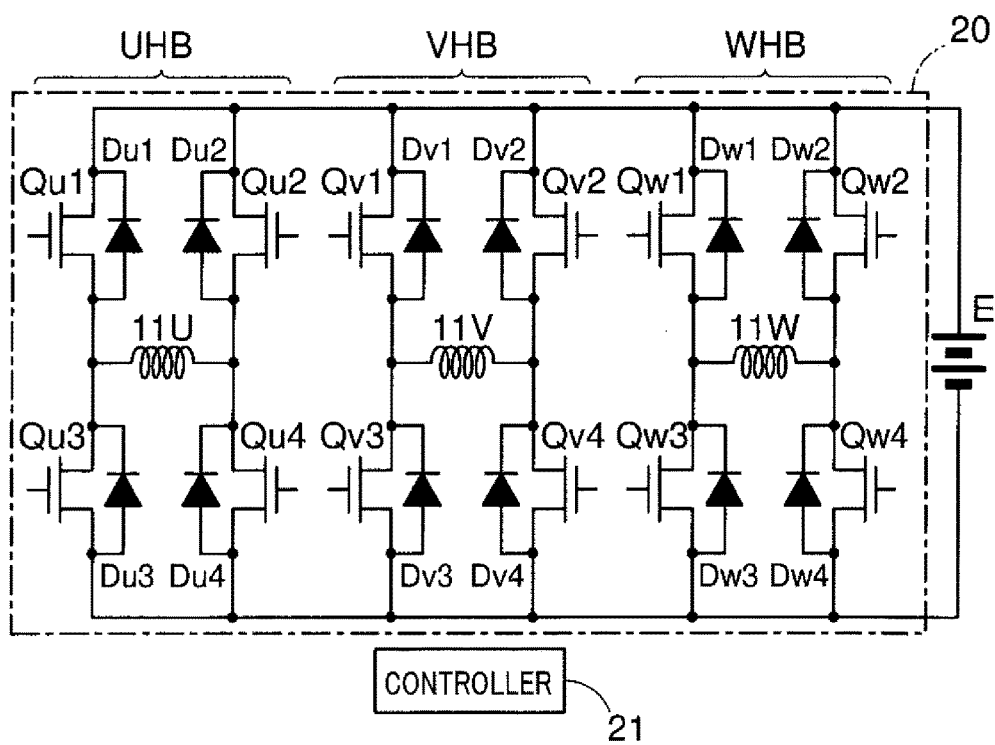
FIG. 5 is a circuit diagram of an electric power converter of the rotating electric machine according to the first embodiment.

FIG. 5 shows the configuration of an electric power converter 20 of the rotating electric machine 10A according to the present embodiment. In addition, for the sake of ease of understanding, the U-phase, V-phase and W-phase windings 11U-11W are also schematically shown in FIG. 5.

As shown in FIG. 5, the electric power converter 20 includes a U-phase H bridge UHB, a V-phase H bridge VHB and a W-phase H bridge WEB. In the present embodiment, all of the U-phase, V-phase and W-phase H bridges have the same configuration. Therefore, for the sake of avoiding redundancy, only the U-phase H bridge will be described hereinafter.

The U-phase H bridge UHB includes four transistors Qu1-Qu4 and four flyback diodes (or freewheeling diodes) Du1-Du4. The transistor Qu1 is connected in series with the transistor Qu3, while the transistor Qu2 is connected in series with the transistor Qu4. Between the junction point between the transistors Qu1 and Qu3 and the junction point between the transistors Qu2 and Qu4, there is connected the U-phase winding 11U so as to bridge the two junction points. The flyback diodes Du1-Du4 are connected respectively in parallel with the transistors Qu1-Qu4 to eliminate flyback.

The on/off operations of the transistors Qu1-Qu4, Qv1-Qv4 and Qw1-Qw4 are individually controlled by a controller 21. In addition, the transistors Qu1-Qu4, Qv1-Qv4 and Qw1-Qw4 may be of any type such that the on/off operations thereof can be individually controlled. For example, each of the transistors Qu1-Qu4, Qv1-Qv4 and Qw1-Qw4 may be implemented by a FET (more specifically, MOSFET, HET or MESFET), an IGBT, a GTO or a power transistor.

The controller 21 functions as a superimposer. The controller 21 performs a control as shown in FIG. 6, thereby energizing the multi-phase coil 11a (i.e., the U-phase, V-phase and W-phase windings 11U-11W).

Figure 6:
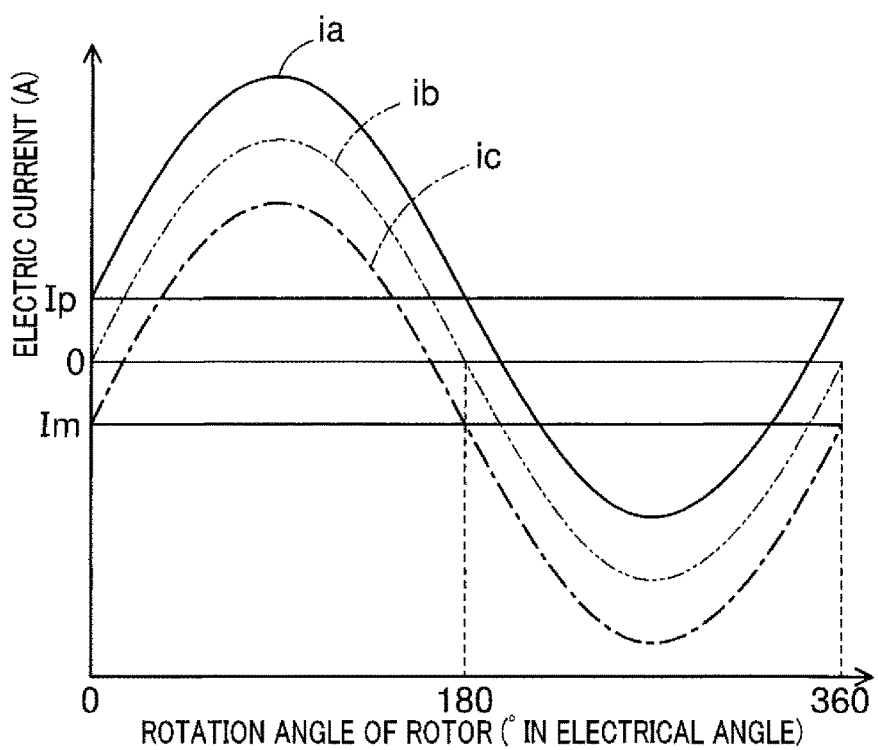
FIG. 6 is a graphical representation illustrating an example of superimposing a DC component on an alternating current.

Specifically, in FIG. 6, there are shown the waveforms of three alternating currents ia, ib and ic, the periods of which are all equal to 360° in electrical angle. The alternating current ib, which is indicated by a two-dot chain line in FIG. 6, represents one phase of the multi-phase alternating current before superimposing a DC (Direct Current) component on the multi-phase alternating current. In other words, the alternating current ib represents a reference phase current supplied to the multi-phase coil 11a. In addition, though the reference phase current has a sine waveform in the present embodiment, it may also have any other waveforms, such as a rectangular waveform.

The alternating current ia, which is indicated by a continuous line in FIG. 6, is obtained by superimposing a plus DC current Ip on the alternating current ib. In contrast, the alternating current ic, which is indicated by a one-dot chain line in FIG. 6, is obtained by superimposing a minus DC current Im on the alternating current ib.

The controller 21 may have any configuration such that it can perform a control of energizing the multi-phase coil 11a through the superimposition of a DC component (e.g., Ip or Im) on the alternating current ib. More specifically, in the control, parameters are separately varied which include the amplitude, frequency and waveform of the alternating current ib, the amplitude of the DC current IP (IP>0) and the amplitude of the DC current Im (Im<0).

The alternating current ia or ic is supplied to the multi-phase coil 11a on a phase basis. Normally, the alternating current ia or ic is supplied to any one of the U-phase, V-phase and W-phase windings 11U-11W of the multi-phase coil 11a while the alternating current ib (i.e., the reference phase current) is supplied to the remaining two of the U-phase, V-phase and W-phase windings 11U-11W. That is, the alternating current ia or ic represents the U-phase current when it is supplied to the U-phase winding 11U, the V-phase current when supplied to the V-phase winding 11V, or the W-phase current when supplied to the W-phase winding 11W. Consequently, by performing the above control, it is possible to supply a DC field magnetic flux to the magnetic circuits MC1 and MC2.

Second Embodiment

A rotating electric machine 10B according to a second embodiment will be described with reference to FIGS. 7-8. The rotating electric machine 10B is another example of the rotating electric machine 10 according to the present invention.

The rotating electric machine 10B according to the present embodiment has a configuration similar to that of the rotating electric machine 10A according to the first embodiment. Accordingly, for the sake of avoiding redundancy, the differences of the rotating electric machine 10B from the rotating electric machine 10A will be mainly described.

Figure 7:
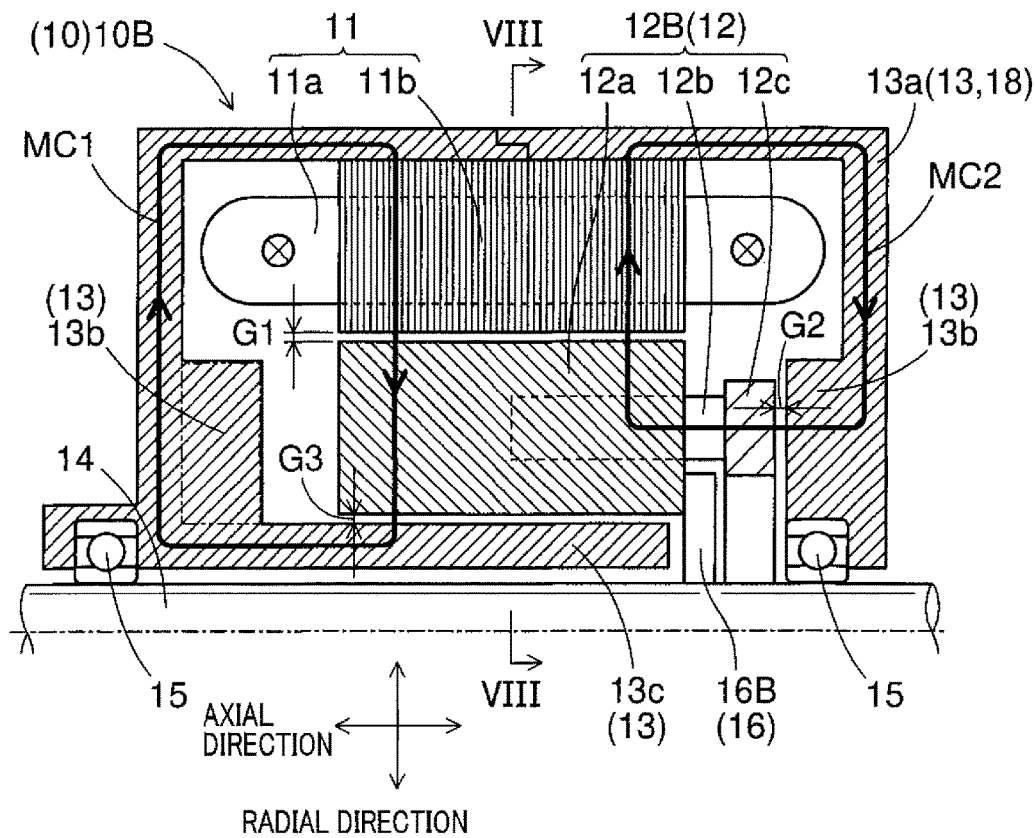
FIG. 7 is a schematic cross-sectional view of an upper half of a rotating electric machine according to a second embodiment.

As shown in FIG. 7, the rotating electric machine 10B according to the present embodiment includes an armature (or stator) 11, a rotor 12B, a rotating shaft 14, a pair of bearings 15 and a support 16B, all of which are received in a yoke core 13.

The support 16B is another example of the support 16 according to the present invention. In the present embodiment, the support 16B is made of a non-magnetic material and fixed on the rotating shaft 14. The support 16B is also fixed to a radially inner part of one axial end face (i.e., the right end face in FIG. 7) of the rotor core 12a of the rotor 12B. That is, the rotor 12B is supported by and fixed to the rotating shaft 14 via the support 16B. Consequently, the rotor 12B and the rotating shaft 14 rotate together with each other.

Compared to the yoke core 13 in the first embodiment (see FIG. 1), in the present embodiment, the yoke core 13 further includes a cylindrical extension 13c. The cylindrical extension 13c extends from a radially inner part of one of the protruding portions 13b (i.e., the left protruding portion 13b in FIG. 7) axially inward (i.e., rightward in FIG. 7). Between the cylindrical extension 13c and a rotor core 12a, there is formed an annular radial gap G3. The size (or width) of the gap G3 can be set to any suitable value to the extent that a magnetic circuit MC1 can be formed.

In the present embodiment, the magnetic circuit MC1 is formed, upon energization of the multi-phase coil 11a, by the armature core 11b, the rotor core 12a, the cylindrical extension 13c and the yoke core 13. In addition, that one of the protruding portions 13b of the yoke core 13 which is indicated with two-dot chain lines in FIG. 7 and has no effect on the formation of the magnetic circuit MC1 may be omitted from the yoke core 13.

The rotor 12B is another example of the rotor 12 according to the present invention. The rotor 12B differs from the rotor 12A in the first embodiment only in the number of the side cores 12c and the configuration of the rotor core 12a.

Specifically, the rotor 12B includes a single annular side core 12c (see FIG. 7), whereas the rotor 12A includes the pair of annular side cores 12c (see FIGS. 1 and 3). Accordingly, in the rotating electric machine 10B according to the present embodiment, there is also formed a magnetic circuit MC2 (see FIG. 7) that is identical to the magnetic circuit MC2 formed in the rotating electric machine 10A according to the first embodiment (see FIG. 1).

Figure 8:
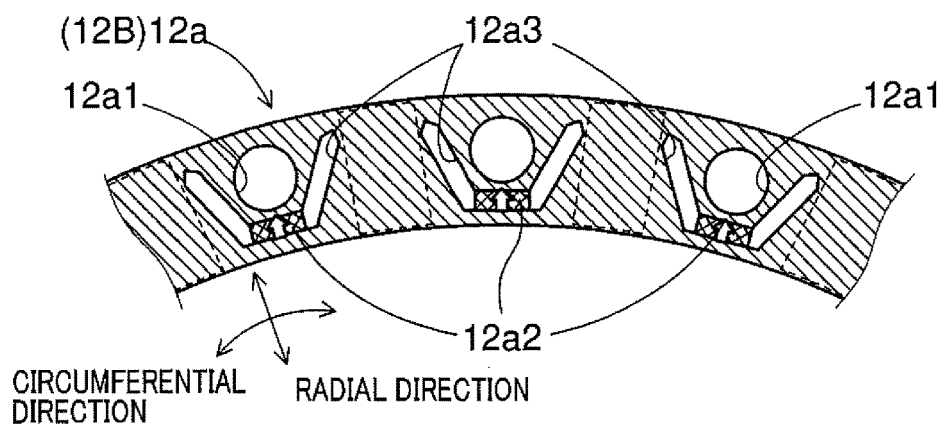
FIG. 8 is a cross-sectional view taken along the line VIII-VIII in FIG. 7, illustrating the configuration of a rotor core of the rotating electric machine according to the second embodiment.

As shown in FIG. 8, in the present embodiment, the rotor core 12a has a plurality of insertion holes 12a1, a plurality of permanent magnets 12a2 and a plurality of magnet-receiving holes 12a3 provided therein. Each of the magnet-receiving holes 12a3 is formed adjacent to one of the insertion holes 12a1 so as to surround the insertion hole 12a1 from three sides (i.e., the radially inner side and both the circumferential sides) of the insertion hole 12a1. Moreover, each of the magnet-receiving holes 12a3 has one of the permanent magnets 12a2 received in at least part of the magnet-receiving hole 12a3.

More specifically, in the present embodiment, each of the magnet-receiving holes 12a3 is groove-shaped to have a bottom part located on the radially inner side of the insertion hole 12a and a pair of side parts respectively on the opposite circumferential sides of the insertion hole 12a. Moreover, in the bottom part of the magnet-receiving hole 12a3, there is received and fixed the permanent magnet 12a2. In operation, magnetic flux flows between a radially outer portion (i.e., an upper portion in FIG. 8) of the rotor core 12a, where no magnet-receiving holes 12a3 are provided, and the armature 11. Consequently, by the formation of the magnet-receiving holes 12a3, it becomes possible to suppress magnetic flux leakage. In addition, it should be noted that each of the magnet-receiving holes 12a3 may also have two or three permanent magnets 12a2 respectively received in the bottom part and either or both of the side parts thereof.

Moreover, for each circumferentially-adjacent pair of the magnet-receiving holes 12a3, a portion of the rotor core 12a, which is located between the circumferentially-adjacent pair of the magnet-receiving holes 12a3 and indicated with dashed lines in FIG. 8, can serve as a passage of magnetic flux that flows through the armature core 11b, the rotor core 12a and the yoke core 13 (more specifically, the main body 13a and the cylindrical extension 13c). Therefore, the portion of the rotor core 12a can constitute a consequent magnetic pole to generate reluctance torque, thereby increasing the total output torque of the rotating electric machine 10B.

Third Embodiment

A rotating electric machine 10C according to a third embodiment will be described with reference to FIG. 9. The rotating electric machine 10C is yet another example of the rotating electric machine 10 according to the present invention.

The rotating electric machine 10C according to the present embodiment has a configuration similar to those of the rotating electric machines 10A and 10B according to the first and second embodiments. Accordingly, for the sake of avoiding redundancy, the differences of the rotating electric machine 10C from the rotating electric machines 10A and 10B will be mainly described.

Figure 9:
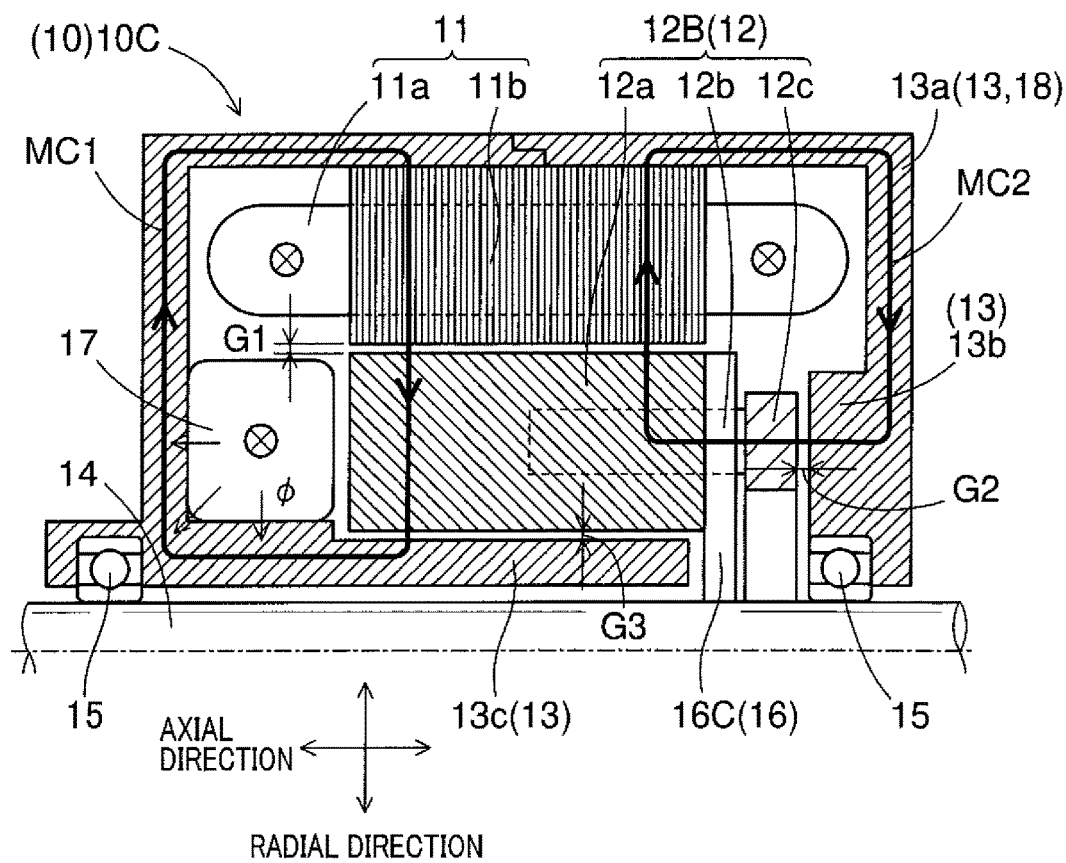
FIG. 9 is a schematic cross-sectional view of an upper half of a rotating electric machine according to a third embodiment.

As shown in FIG. 9, the rotating electric machine 10C according to the present embodiment includes an armature (or stator) 11, a rotor 12B, a rotating shaft 14, a pair of bearings 15, a support 16C and an excitation means 17, all of which are received in a yoke core 13.

The support 16C is yet another example of the support 16 according to the present invention. In the present embodiment, the support 16C is made of a non-magnetic material and fixed on the rotating shaft 14. The support 16C is also fixed to the whole of one axial end face (i.e., the right end face in FIG. 9) of the rotor core 12a of the rotor 12B. That is, the rotor 12B is supported by and fixed to the rotating shaft 14 via the support 16C. Consequently, the rotor 12B and the rotating shaft 14 rotate together with each other.

The excitation means 17 is provided in the yoke core 13. To the excitation means 17, there is supplied a DC current (or DC voltage) that is different from the DC current superimposed by the controller 21 on the multi-phase alternating current. Consequently, upon being supplied with the DC current, the excitation means 17 generates magnetic flux Φ; the magnetic flux Φ is added to the magnetic circuit MC1, thereby enhancing the excitation force.

Fourth Embodiment

A rotating electric machine 10D according to a fourth embodiment will be described with reference to FIGS. 10-11. The rotating electric machine 10D is yet another example of the rotating electric machine 10 according to the present invention.

The rotating electric machine 10D according to the present embodiment has a configuration similar to those of the rotating electric machines 10A-10C according to the first to the third embodiments. Accordingly, for the sake of avoiding redundancy, the differences of the rotating electric machine 1 0D from the rotating electric machines 10A-10C will be mainly described.

Figure 10:
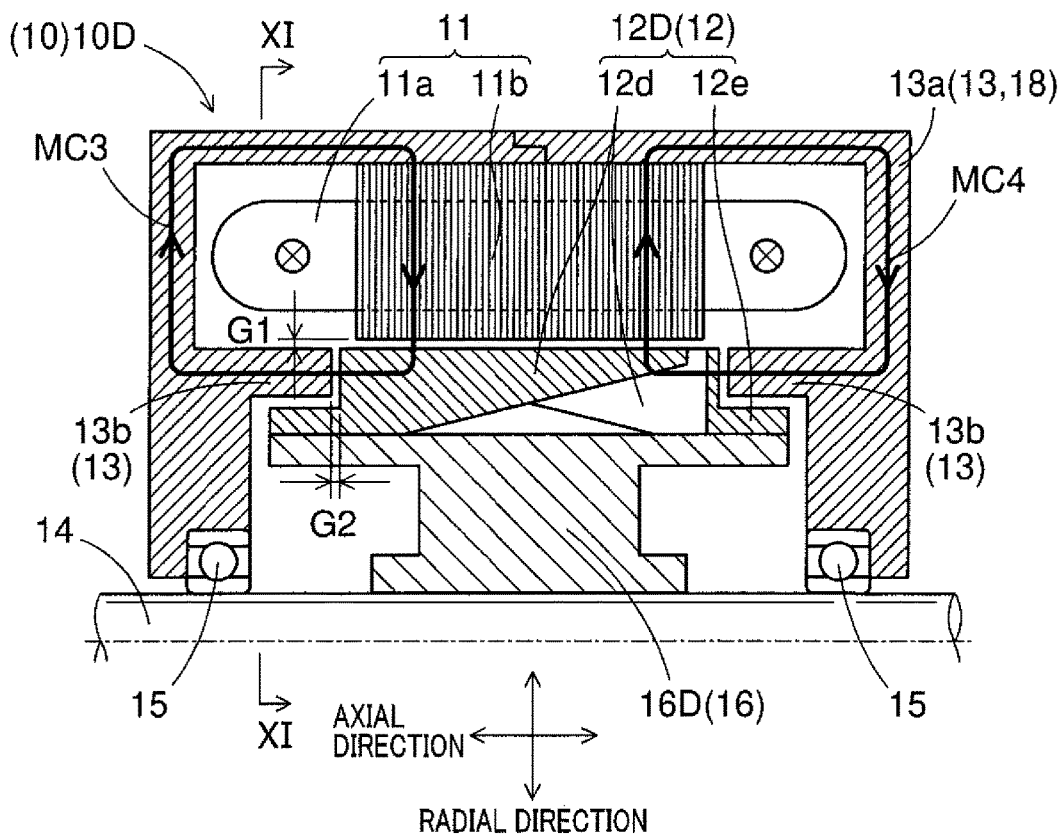
FIG. 10 is a schematic cross-sectional view of an upper half of a rotating electric machine according to a fourth embodiment.
Figure 11:
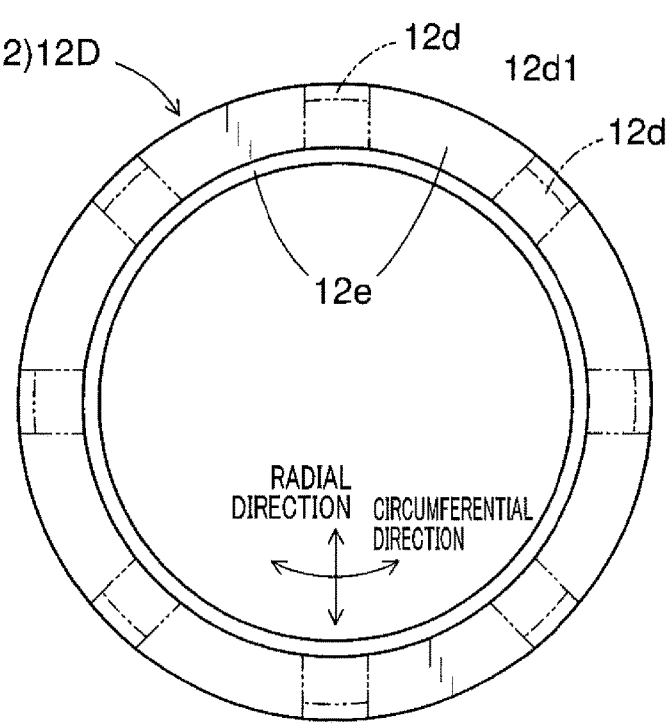
FIG. 11 is a side view along the arrows XI in FIG. 10, illustrating the configuration of claw-shaped magnetic poles of the rotating electric machine according to the fourth embodiment.

As shown in FIG. 10, the rotating electric machine 10D according to the present embodiment includes an armature (or stator) 11, a rotor 12D, a rotating shaft 14, a pair of bearings 15 and a support 16D, all of which are received in a yoke core 13.

The support 16D is yet another example of the support 16 according to the present invention. In the present embodiment, the support 16B is made of a non-magnetic material and fixed on the rotating shaft 14. The support 16D is also fixed to a radially inner periphery of the rotor 12D. That is, the rotor 12D is supported by and fixed to the rotating shaft 14 via the support 16D. Consequently, the rotor 12D and the rotating shaft 14 rotate together with each other.

The rotor 12D is yet another example of the rotor 12 according to the present invention. As shown in FIGS. 10-11, the rotor 12D includes first and second annular bases 12e that are respectively fixed on opposite axial end portions of the support 16D. The first annular base 12e has a plurality of claw-shaped magnetic poles 12d axially extending therefrom toward the second annular base 12e; the radial thicknesses of the magnetic poles 12d are gradually decreased in the axial direction toward the second annular base 12e. Similarly, the second annular base 12e has a plurality of claw-shaped magnetic poles 12d axially extending therefrom toward the first annular base 12e; the radial thicknesses of the magnetic poles 12d are gradually decreased in the axial direction toward the first annular base 12e. Moreover, the magnetic poles 12d extending from the first annular base 12e are interleaved with the magnetic poles 12d extending from the second annular base 12e. Consequently, in the circumferential direction of the rotor 12D, the magnetic poles 12d extending from the first annular base 12e are positioned alternately with the magnetic poles 12d extending from the second annular base 12e. Furthermore, all of the magnetic poles 12d extending from the first annular base 12e and the magnetic poles 12d extending from the second annular base 12e radially face the armature core 11b of the armature 11.

In addition, the number of the magnetic poles 12d extending from the first annular base 12e and the magnetic poles 12d extending from the second annular base 12e may be set to any suitable number. For example, the number of the magnetic poles 12d may be set to be equal to the number of magnetic poles of the armature 11. In addition, each of the first and second annular bases 12e may be either separately formed from and then fixed to or integrally formed into one piece with the magnetic poles 12d extending therefrom.

Referring again to FIG. 10, upon energization of a multi-phase coil 11a, magnetic circuits MC3 and MC4 are formed by the armature core 11b, the magnetic poles 12d and the yoke core 13. The magnetic circuits MC3 and MC4 correspond respectively to the magnetic circuits MC1 and MC2 in the first embodiment (see FIG. 1). Between the armature 11 and the rotor 12D (more specifically, the magnetic poles 12d), there is formed an annular radial gap G1. Moreover, between the rotor 12D and the yoke core 13 (more specifically, the protruding portions 13b), there are formed a pair of axial gaps G2 respectively on opposite axial sides of the rotor 12D.

Fifth Embodiment

A rotating electric machine 10E according to a fifth embodiment will be described with reference to FIGS. 12-13. The rotating electric machine 10E is yet another example of the rotating electric machine 10 according to the present invention.

The rotating electric machine 10E according to the present embodiment has a configuration similar to those of the rotating electric machines 10A-10D according to the first to the fourth embodiments. Accordingly, for the sake of avoiding redundancy, the differences of the rotating electric machine 10E from the rotating electric machines 10A-10D will be mainly described.

Figure 12:
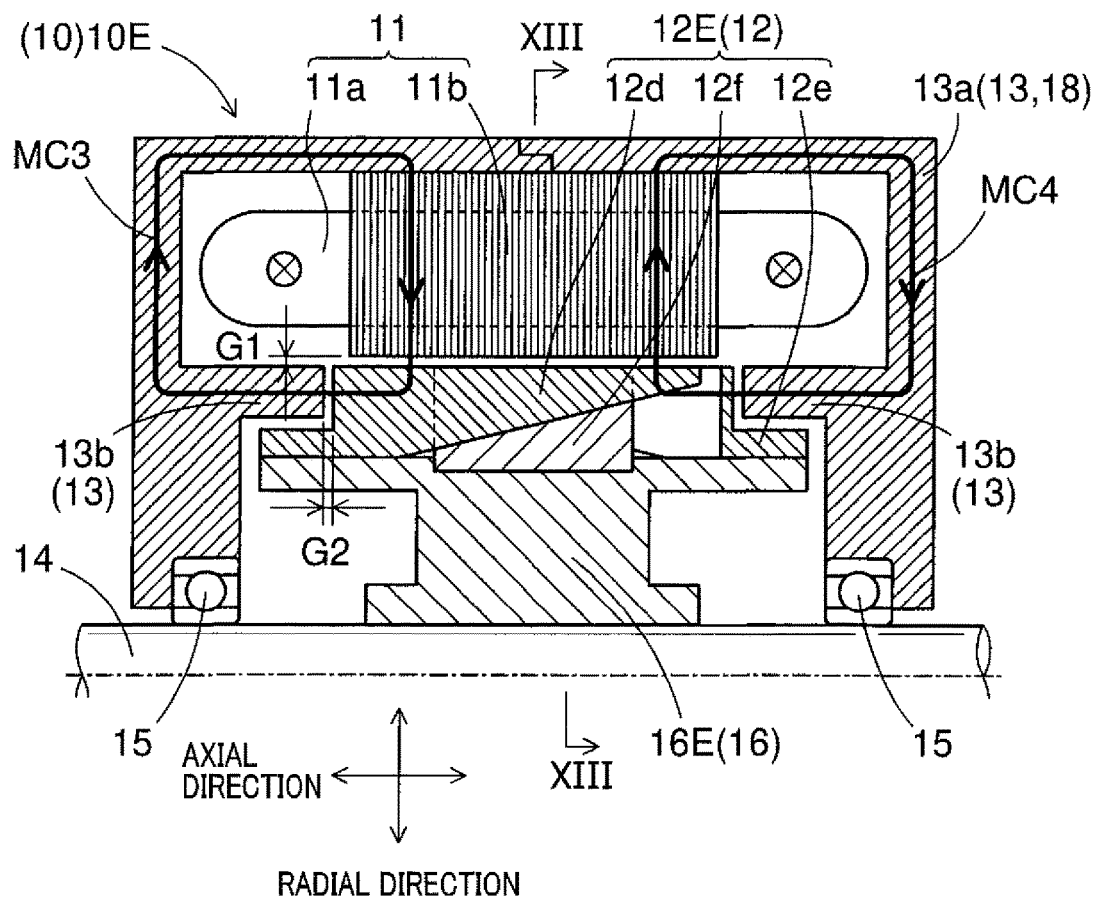
FIG. 12 is a schematic cross-sectional view of an upper half of a rotating electric machine according to a fifth embodiment.

As shown in FIG. 12, the rotating electric machine 10E according to the present embodiment includes an armature (or stator) 11, a rotor 12E, a rotating shaft 14, a pair of bearings 15 and a support 16E, all of which are received in a yoke core 13.

The support 16E is yet another example of the support 16 according to the present invention. In the present embodiment, the support 16E is made of a non-magnetic material and fixed on the rotating shaft 14. The support 16E is also fixed to a radially inner periphery of the rotor 12E. That is, the rotor 12E is supported by and fixed to the rotating shaft 14 via the support 16E. Consequently, the rotor 12E and the rotating shaft 14 rotate together with each other.

The rotor 12E is yet another example of the rotor 12 according to the present invention. As shown in FIG. 12, the rotor 12E includes a pair of annular bases 12e each having a plurality of claw-shaped magnetic poles 12d axially extending therefrom, a nonpolar auxiliary pole 12f and a plurality of permanent magnets 12g.

The annular bases 12e are identical to those in the fourth embodiment. The magnetic poles 12d are similar to those in the fourth embodiment. Therefore, description of the annular bases 12e and the magnetic poles 12d is omitted hereinafter.

Figure 13:
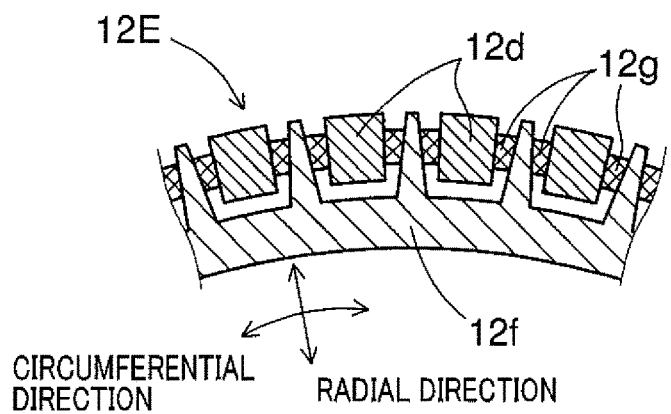
FIG. 13 is a cross-sectional view taken along the line XIII-XIII in FIG. 12, illustrating the configuration of a rotor of the rotating electric machine according to the fifth embodiment.

As shown in FIGS. 12-13, the auxiliary pole 12f has an annular portion fixed to the support 16E and a plurality of protruding portions that protrude from the annular portion radially outward and are circumferentially spaced at equal intervals. That is, the annular portion and the protruding portions are magnetically connected with each other. Each of the protruding portions of the auxiliary poles 12f is located between one circumferentially-adjacent pair of the magnetic poles 12d. Moreover, each of the permanent magnets 12g is provided between one circumferentially-facing pair of the magnetic poles 12d and the protruding portions of the auxiliary pole 12f.

With the above configuration, each of the protruding portions of the auxiliary pole 12f constitutes a consequent magnetic pole. Moreover, each circumferentially-adjacent pair of the consequent magnetic poles (i.e., the protruding portions of the auxiliary pole 12f) are magnetically connected, on the radially inside of the permanent magnets 12g, by the annular portion of the auxiliary pole 12f.

Sixth Embodiment

Figure 14:
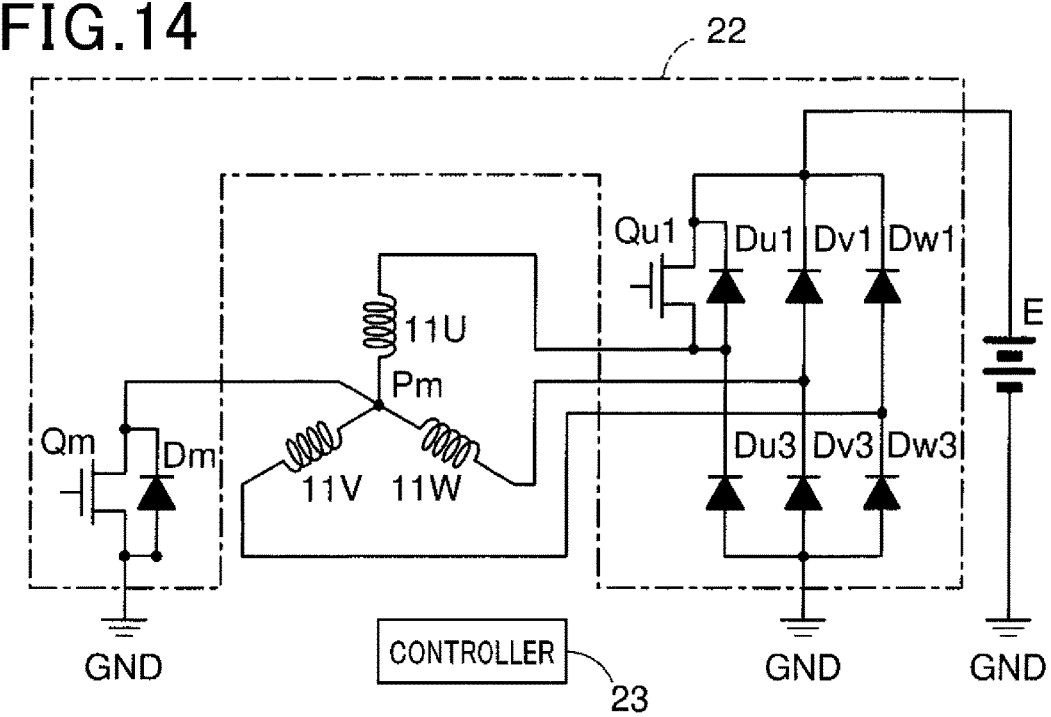
FIG. 14 is a circuit diagram of an electric power converter of a rotating electric machine according to a sixth embodiment.

FIG. 14 shows the configuration of an electric power converter 22 according to a sixth embodiment.

In the present embodiment, the electric power converter 22 is configured to convert three-phase electric power generated by a multi-phase coil 11a (i.e., U-phase, V-phase and W-phase windings 11U-11W) into DC power and charge an electric power source E with the obtained DC power. In addition, the U-phase, V-phase and W-phase windings 11U-11W are Y-connected to define a neutral point Pm therebetween.

As shown in FIG. 14, the electric power converter 22 includes transistors Qu1 and Qm and diodes Du1, Du3, Dv1, Dv3, Dw1, Dw3 and Dm. The diodes Du1, Du3, Dv1, Dv3, Dw1 and Dw3 are connected to form a three-phase full-wave bridge. The diode Dm is connected between the neutral point Pm and the ground GND. In addition, the ground GND represents a common reference electric potential and is not necessarily set to 0[V].

Moreover, the transistor Qu1 is connected in parallel with the diode Du1. The transistor Qm is connected in parallel with the diode Dm. The drives of the transistors Qu1 and Qm are individually controlled by a controller 23.

The controller 23 corresponds to charging controlling means. The controller 23 may have any configuration such that it can control the electric power converter 22 to convert the three-phase electric power generated by the multi-phase coil 11a into the DC power and charge the electric power source E with the obtained DC power. Moreover, the configuration of the controller 23 may be either identical to or different from the configuration of the controller 21 in the first embodiment. Furthermore, the controller 23 may also be configured to have, in addition to its own functions, the functions of the controller 21. In addition, the functions of each of the controllers 21 and 23 may be realized either by executing programs by a CPU (i.e., by software) or by operations of logic circuits (i.e., by hardware).

The above-described electric power converter 22 and controller 23 can be applied to the rotating electric machines 10A-10E according to the first to the fifth embodiments and a rotating electric machine 10F according to a seventh embodiment which will be described later.

In addition, though not shown in the figures, at least one of the diodes Du3, Dv1, Dv3, Dw1 and Dw3 may have a transistor connected in parallel therewith and the on/off operation of the transistor may be controlled by the controller 23. In the case of connecting a plurality of transistors respectively in parallel with the diodes Du3, Dv1, Dv3, Dw1 and Dw3, the resultant configuration corresponds to the left halves of the U-phase, V-phase and W-phase H bridges shown in FIG. 5.

Seventh Embodiment

A rotating electric machine 10F according to a seventh embodiment will be described with reference to FIGS. 15-16. The rotating electric machine 10F is yet another example of the rotating electric machine 10 according to the present invention.

The rotating electric machine 10F according to the present embodiment has a configuration similar to those of the rotating electric machines 10A-10E according to the first to the fifth embodiments. Accordingly, for the sake of avoiding redundancy, the differences of the rotating electric machine 10F from the rotating electric machines 10A-10E will be mainly described.

Figure 15:
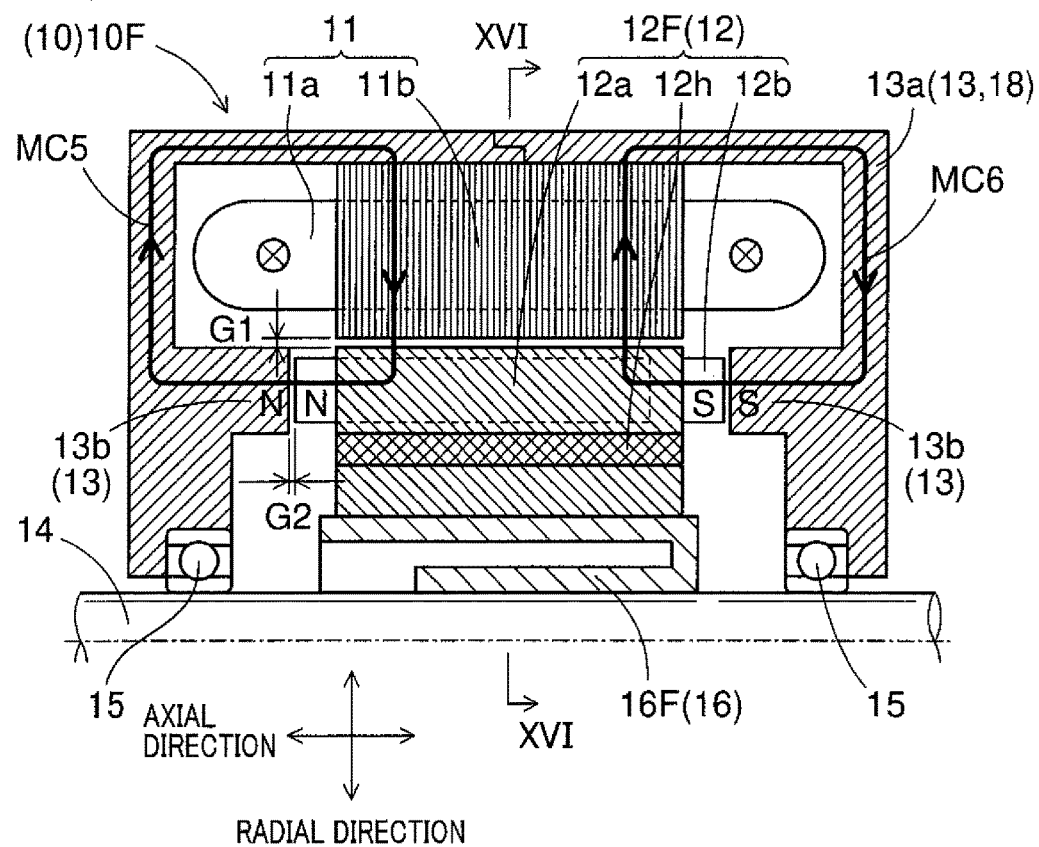
FIG. 15 is a schematic cross-sectional view, including a cross section taken along the line XV-XV in FIG. 16, of an upper half of a rotating electric machine according to a seventh embodiment.

As shown in FIG. 15, the rotating electric machine 10F according to the present embodiment includes an armature (or stator) 11, a rotor 12F, a rotating shaft 14, a pair of bearings 15 and a support 16F, all of which are received in a yoke core 13.

The support 16F is yet another example of the support 16 according to the present invention. In the present embodiment, the support 16F is made of a non-magnetic material and fixed on the rotating shaft 14. The support 16F is also fixed to a radially inner periphery of the rotor 12F. That is, the rotor 12F is supported by and fixed to the rotating shaft 14 via the support 16F. Consequently, the rotor 12F and the rotating shaft 14 rotate together with each other.

The rotor 12F is yet another example of the rotor 12 according to the present invention. As shown in FIG. 15, the rotor 12F includes a rotor core 12a, a plurality of soft-magnetic members 12b and a plurality of permanent magnets 12h. The rotor 12F differs from the rotor 12A in the first embodiment in that the rotor 12F has no annular side cores 12c.

Figure 16:
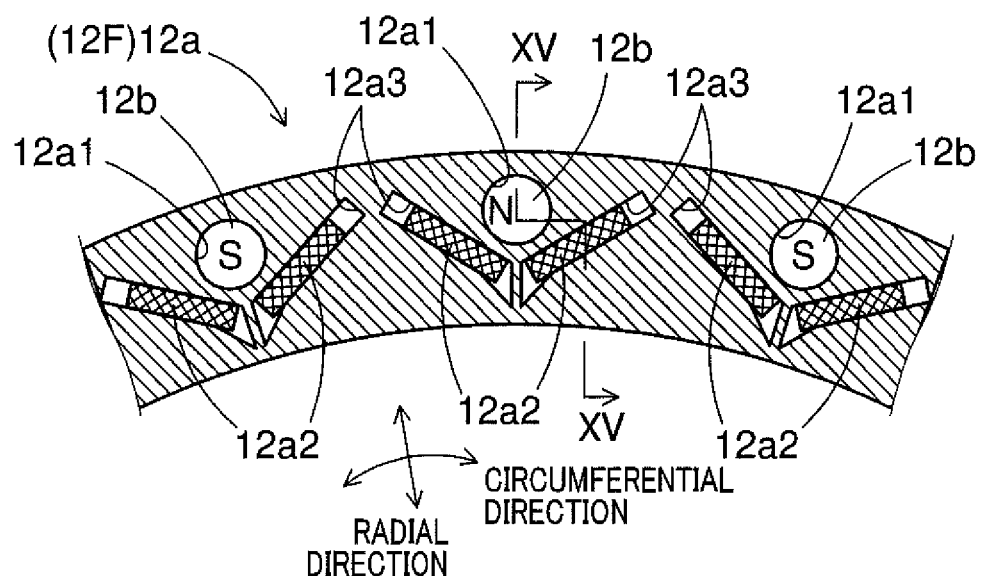
FIG. 16 is a cross-sectional view taken along the line XVI-XVI in FIG. 15, illustrating the configuration of a rotor core of the rotating electric machine according to the seventh embodiment.

As shown in FIG. 16, the rotor core 12a has a plurality of insertion holes 12a1, a plurality of permanent magnets 12a2 and a plurality of pairs of magnet-receiving holes 12a3 provided therein. Each of the soft-magnetic members 12b is inserted and fixed in one of the insertion holes 12a1. Moreover, the soft-magnetic members 12b are excited so that the polarities of the soft-magnetic members 12b alternate between north (N) and south (S) in the circumferential direction of the rotor core 12a. Each pair of the magnet-receiving holes 12a3 is formed into a substantially V-shape that opens toward the radially outer periphery of the rotor core 12a and has one of the insertion holes 12a1 located within the substantially V-shape. Moreover, in the present embodiment, each of the magnet-receiving holes 12a3 has one of the permanent magnets 12a2 received and fixed therein. However, it should be noted that the permanent magnets 12a2 may be received in the magnet-receiving holes 12a3 as needed. In operation, magnetic flux flows between a radially outer portion (i.e., an upper portion in FIG. 16) of the rotor core 12a, where no magnet-receiving holes 12a3 are provided, and the armature 11. Consequently, by the formation of the magnet-receiving holes 12a3, it becomes possible to suppress magnetic flux leakage.

Referring back to FIG. 15, upon energization of a multi-phase coil 11a, magnetic circuits MC5 and MC6 are formed by the armature core 11b, the rotor core 12a, the soft-magnetic members 12b and the yoke core 13. The magnetic circuits MC5 and MC6 respectively correspond to the magnetic circuits MC1 and MC2 shown in FIG. 1. Between the armature 11 and the rotor core 12a of the rotor 12F, there is formed an annular radial gap G1. Between the soft-magnetic members 12b of the rotor 12F and the protruding portions 13b of the yoke core 13, there are formed a pair of axial gaps G2 respectively on opposite axial sides of the rotor 12F.

Other Embodiments

While the above particular embodiments have been shown and described, it will be understood by those skilled in the art that the present invention can also be embodied in various other modes without departing from the spirit of the present invention.

For example, as the combinations of the armature 11 and the rotor 12, the armature 11 and the rotor 12A are employed in the first embodiment (see FIG. 1); the armature 11 and the rotor 12B are employed in the second and third embodiments (see FIGS. 7 and 9); the armature 11 and the rotor 12D are employed in the fourth embodiment (see FIG. 10); the armature 11 and the rotor 12E are employed in the fifth embodiment (see FIG. 12); and the armature 11 and the rotor 12F are employed in the seventh embodiment (see FIG. 15). However, the armature 11 and the rotor 12 (or 12A-12B, 12D-12F) may also be combined in other ways in the first to the seventh embodiments provided that the magnetic circuits MC1-MC6 can be formed.

In the third embodiment, the rotating electric machine 10C has the excitation means 17 provided therein (see FIG. 9). Similarly, the rotating electric machines 10A-10B and 10D-10E in the first, second and fourth to seventh embodiments may be modified to have an excitation means 17 provided therein.

In the first to the seventh embodiments, each of the permanent magnets 12a2 and 12g is formed in one piece (see FIGS. 2, 8 and 13). However, at least one of the permanent magnets 12a2 and 12g may be formed of a plurality of permanent magnet segments.

In the first to the seventh embodiments, the entire yoke core 13 is configured as the supporting member 18 that supports at least the armature core 11b (see FIGS. 1, 7, 9-10, 12 and 15). However, it is also possible to configure only part of the yoke core 13 as the supporting member 18. More specifically, the yoke core 13 may be modified so that part of the yoke core 13 functions as the supporting member 18 while the remainder of the yoke core 13 is utilized for formation of the magnetic circuits MC1-MC6.

In the first to third and seventh embodiments, the soft-magnetic members 12b are cylindrical-shaped (see FIGS. 1-3, 7, 9 and 15). However, the soft-magnetic members 12b may also have other shapes, such as a polygonal prismatic shape (e.g., triangular prismatic shape or quadrangular prismatic shape) or a polygonal pyramidal shape (e.g., triangular pyramidal shape or quadrangular pyramidal shape).

Advantageous Effects

According to the above-described embodiments, it is possible to achieve the following advantageous effects.

(1) The rotating electric machine 10 (or 10A-10F) includes: the multi-phase coil 11a; the armature core 11b having the multi-phase coil 11a wound thereon; the rotor 12 (or 12A-12F) rotatably disposed and having the magnetic poles facing the armature core 11b; the yoke core 13 arranged so as to surround the outer peripheries of the multi-phase coil 11a and the armature core 11b, the yoke core 13 being magnetically connected with the magnetic poles of the rotor 12; and the superimposer (i.e., the controller 21 or 23) that superimposes the DC component Ip or Im on the multi-phase alternating current supplied to the multi-phase coil 11a, thereby supplying the DC field magnetic flux to the magnetic circuits (MC1-MC6) that are formed by the armature core 11b, the magnetic poles of the rotor 12 and the yoke core 13 (see FIGS. 1, 5-7, 9-10, 11 and 15).

With the above configuration, it becomes possible to apply a field without employing brushes. Moreover, it is possible to control the field by varying the amplitude and/or direction of the DC component. In other words, it is possible to perform the field control while performing the electric drive control of the rotating electric machine 10 by controlling the multi-phase alternating current supplied to the multi-phase coil 11a. Consequently, it becomes possible to realize a brushless variable field without employing a field winding. Further, since no additional winding is needed for performing the field control, it becomes possible to minimize the size of the rotating electric machine 10. Moreover, since the field is applied by utilizing the multi-phase coil 11a wound on the armature core 11b, it becomes possible to secure desired characteristics of the rotating electric machine 10. As a result, it becomes possible to achieve both minimization of the size of the rotating electric machine 10 and the brushless variable field.

(2) Part or the whole of the yoke core 13 is configured as the supporting member 18 to support the armature core 11b (see FIGS. 1, 7, 9-10, 12 and 15).

With the above configuration, it becomes possible to reduce the material cost, the parts count, the number of manufacturing steps and the size of the rotating electric machine 10.

(3) The rotor 12 (or 12A-12F) includes the rotor core 12a, the permanent magnets 12a2, at least one insertion hole 12a1 and at least one soft-magnetic member 12b. The rotor core 12a is formed by laminating a plurality of annular magnetic steel sheets in the axial direction thereof. The permanent magnets 12a2 are provided in the rotor core 12a so as to be spaced from each other in the circumferential direction of the rotor core 12a. The at least one insertion hole 12a1 is formed between one circumferentially-adjacent pair of the permanent magnets 12a2. The at least one soft-magnetic member 12b is inserted and fixed in the at least one insertion hole 12a1. The magnetic poles of the rotor 12 are formed of the permanent magnets 12a2 and the at least one soft-magnetic member 12b (see FIGS. 1-3 and 15-16).

With the above configuration, the saliency of the rotor 12, by which magnetic flux is concentrated and thus can more easily flow, is improved. Consequently, the performance of the entire rotating electric machine 10 is improved. Moreover, since the rotor core 12a are formed of the annular bodies (i.e., the annular magnetic steel sheets), it becomes possible to secure high resistance to centrifugal force and high rigidity of the rotor core 12a.

(4) The multi-phase coil 11a (or the U-phase, V-phase and W-phase windings 11U-11W) is a wave-shaped full-pitch coil that is wound on the armature core 11b so as to meander alternately in the axial and circumferential directions of the armature core 11b at a circumferential pitch that is 180° in electrical angle (see FIG. 4).

With the above configuration, the DC component can be more effectively converted into an excitation magnetomotive force in comparison with a lap coil or short-pitch coil. Consequently, it becomes possible to more easily secure desired characteristics of the rotating electric machine 10.

(5) The rotating electric machine 10 includes the electric power converter 20 that has one H bridge for each phase of the multi-phase coil 11a (i.e., the U-phase H bridge UHB, the V-phase H bridge VHB and the W-phase H bridge). In superimposing the DC component Ip or Im on the multi-phase alternating current, the controller 21 varies the amplitude of the multi-phase alternating current and the amplitude of the DC component Ip or Im separately (see FIGS. 5-6).

With the above configuration, it becomes possible to control the multi-phase coil 11a on a phase basis in addition to separately controlling the multi-phase alternating current and the DC component Ip or Im. Consequently, it becomes possible to perform a desired control such as a torque-oriented control or a rotational speed-oriented control.

(6) The yoke core 13 and the magnetic poles of the rotor 12 (or 12B) are magnetically connected with each other via the axial gap G2 and the radial gap G3. The axial gap G2 is forming between the yoke core 13 and the rotor 12 in the axial direction of the rotor 12. The radial gap G3 is formed between the yoke core 13 and the rotor 12 on the opposite radial side of the rotor 12 to the armature core 11b (see FIGS. 7 and 9).

With the above configuration, it becomes possible to reduce the number of the soft-magnetic members 12b and thus the number of processes for inserting the soft-magnetic members 12b.

(7) The rotating electric machine 10 (or 10C) includes the excitation means 17 provided in the yoke core 13. Upon being supplied with a direct current that is different from the DC component Ip or Im superimposed by the controller 21 on the multi-phase alternating current, the excitation means 17 generates the magnetic flux Φ which is added to the magnetic circuit MC1 (see FIG. 9).

Consequently, with the magnetic flux Φ, it becomes possible to enhance the excitation force.

(8) The magnetic poles 12d of the rotor 12 (or 12D-12E) are claw-shaped and supported by the non-magnetic support 16 (or 16D-16E) (see FIGS. 10-13).

With the above configuration, it becomes possible to provide gaps between the magnetic poles 12d in the rotor 12, thereby allowing the rotor 12 and the multi-phase coil 11a to be more easily cooled.

(9) The rotating electric machine 10 (or 10E) includes the nonpolar auxiliary pole 12f that has the annular portion and the protruding portions that protrude from the annular portion and are magnetically connected with each other via the annular portion. Each of the protruding portions of the auxiliary pole 12f is located between one circumferentially-adjacent pair of the magnetic poles 12d (see FIGS. 12-13).

With the above configuration, it becomes possible to lower the q-axis reluctance and improve the inverse-saliency of the rotor 12 (or 12E), thereby improving the performance of the entire rotating electric machine 10.

(10) The multi-phase coil 11a is a Y-connected three-phase coil. The rotating electric machine 10 includes the transistors Qu1 and Qm, which intervene between the neutral point Pm of the three-phase coil 11a and the electric power source E, and the controller 23 for controlling the on/off operation of the transistors Qu1 and Qm and thereby charging the electromotive force of the three-phase coil 11a into the electric power source E (see FIG. 14).

With the above configuration, it becomes possible to reduce the number of the required transistors.

What is claimed is:

1. A rotating electric machine comprising:
   a multi-phase coil;
   an armature core having the multi-phase coil wound thereon;
   a rotor rotatably disposed and having a plurality of magnetic poles facing the armature core;
   a yoke core arranged so as to surround outer peripheries of the multi-phase coil and the armature core, the yoke core being magnetically connected with the magnetic poles of the rotor;
   an electric power converter that has one H bridge for each phase of the multi-phase coil; and
   a superimposer that superimposes a direct current on a multi-phase alternating current supplied to the multi-phase coil by varying an amplitude of the multi-phase alternating current and an amplitude of the direct current separately, thereby supplying a DC field magnetic flux, which is caused by the direct current, to a magnetic circuit that is formed by the armature core, the magnetic poles of the rotor and the yoke core.

2. The rotating electric machine as set forth in claim 1, wherein part or the whole of the yoke core is configured as a supporting member to support the armature core.

3. The rotating electric machine as set forth in claim 1, wherein the rotor includes a rotor core, a plurality of permanent magnets, at least one insertion hole and at least one soft-magnetic member,
   the rotor core is formed by laminating a plurality of annular magnetic steel sheets,
   the permanent magnets are provided in the rotor core so as to be spaced from each other in a circumferential direction of the rotor core,
   the at least one insertion hole is formed between one circumferentially-adjacent pair of the permanent magnets, and
   the at least one soft-magnetic member is inserted and fixed in the at least one insertion hole; and
   the magnetic poles of the rotor are formed of the permanent magnets and the at least one soft-magnetic member.

4. The rotating electric machine as set forth in claim 1, wherein the multi-phase coil is a wave-shaped full-pitch coil that is wound on the armature core so as to meander alternately in the axial and circumferential directions of the armature core at a circumferential pitch that is 180° in electrical angle.

5. The rotating electric machine as set forth in claim 1, wherein the yoke core and the magnetic poles of the rotor are magnetically connected with each other via an axial gap and a radial gap, the axial gap being formed between the yoke core and the rotor in an axial direction of the rotor, the radial gap being formed between the yoke core and the rotor on the opposite radial side of the rotor to the armature core.

6. The rotating electric machine as set forth in claim 1, further comprising an excitation means provided in the yoke core, wherein upon being supplied with a direct current that is different from the direct current superimposed by the superimposer on the multi-phase alternating current, the excitation means generates magnetic flux which is added to the magnetic circuit.

7. The rotating electric machine as set forth in claim 1, wherein the magnetic poles of the rotor are claw-shaped and supported by a non-magnetic support.

8. The rotating electric machine as set forth in claim 1, further comprising a nonpolar auxiliary pole that has an annular portion and a plurality of protruding portions that protrude from the annular portion and are magnetically connected with each other via the annular portion, each of the protruding portions of the auxiliary pole being located between one circumferentially-adjacent pair of the magnetic poles.

9. The rotating electric machine as set forth in claim 1, wherein the multi-phase coil is a Y-connected three-phase coil, the rotating electric machine further comprising at least one transistor, which intervenes between a neutral point of the three-phase coil and an electric power source, and means for controlling on/off operation of the at least one transistor and thereby charging an electromotive force of the three-phase coil into the electric power source.

10. The rotating electric machine as set forth in claim 1, wherein the multi-phase alternating current is comprised of a plurality of phase currents, and the superimposer superimposes the direct current to the multi-phase alternating current so that each time one of the phase currents is a resultant current of a reference alternating current and the direct current while each of the remaining phase currents is equivalent to the reference alternating current.

11. The rotating electric machine as set forth in claim 1, wherein each H bridge for each phase of the multi-phase coil comprises:

a first transistor connected in series with a third transistor with a first junction therebetween;

a second transistor connected in series with a fourth transistor with a second junction therebetween; and a winding of the phase associated with the respective H bridge, connected between the first junction and the second junction.

12. The rotating electric machine as set forth in claim 11, wherein each H bridge for each phase of the multi-phase coil further comprises:

four flyback diodes, each flyback diode being connected in parallel with one of the first through fourth transistors.

* * * * *